(12) United States Patent
Izawa et al.

(10) Patent No.: US 7,605,347 B2
(45) Date of Patent: Oct. 20, 2009

(54) CONTROL SYSTEM USING WORKING ROBOT, AND WORK PROCESSING METHOD USING THIS SYSTEM

(75) Inventors: Akinobu Izawa, Osaka (JP); Tetsuo Era, Osaka (JP); Koji Ueda, Wako (JP); Takeshi Yamagami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 94 days.

(21) Appl. No.: 10/544,637

(22) PCT Filed: Feb. 5, 2004

(86) PCT No.: PCT/JP2004/001224

§ 371 (c)(1),
(2), (4) Date: May 11, 2006

(87) PCT Pub. No.: WO2004/069491

PCT Pub. Date: Aug. 19, 2004

(65) Prior Publication Data

US 2007/0145027 A1    Jun. 28, 2007

(30) Foreign Application Priority Data

Feb. 6, 2003    (JP) .............................. 2003-029179

(51) Int. Cl.
*B23K 9/12* (2006.01)
(52) U.S. Cl. ..................... 219/124.34; 901/42
(58) Field of Classification Search ............ 219/124.34, 219/121.63, 121.64; 228/7, 9, 102, 104, 228/105; 901/42
See application file for complete search history.

(56) References Cited

U.S. PATENT DOCUMENTS

| | | | | |
|---|---|---|---|---|
| 4,380,696 A | * | 4/1983 | Masaki ................. | 219/124.34 |
| 4,568,816 A | * | 2/1986 | Casler, Jr. ............. | 219/124.34 |
| 4,675,502 A | * | 6/1987 | Haefner et al. ........ | 219/124.34 |
| 4,965,499 A | * | 10/1990 | Taft et al. ............... | 219/124.34 |
| 5,006,999 A | * | 4/1991 | Kuno et al. ............ | 219/124.34 |
| 5,582,750 A | * | 12/1996 | Hamura et al. ......... | 219/124.34 |
| 5,624,588 A | * | 4/1997 | Terawaki et al. ....... | 219/124.34 |

(Continued)

FOREIGN PATENT DOCUMENTS

JP    56-102379 A    8/1981

(Continued)

OTHER PUBLICATIONS

Kin et al., "An Adaptive Tracking of Weld Joints Using Active Contour Moedl in Arc Welding Processes", 2001, Proceedings of SPIE, vol. 4190, pp. 29-40.*

*Primary Examiner*—Geoffrey S Evans
(74) *Attorney, Agent, or Firm*—Arent Fox LLP (57) ABSTRACT

The control system includes a welding robot which moves a welding torch along a work for welding the work. A robot controller controls driving of the welding robot. A laser sensor head detects a shape change in the work during welding by the welding torch, and a personal computer obtains instruction information for the welding robot in accordance with the shape change, based on a result of detection by the laser sensor head. The robot controller moves the welding torch by controlling the driving of the working robot, based on the instruction information obtained by the personal computer.

5 Claims, 11 Drawing Sheets

U.S. PATENT DOCUMENTS

| | | | |
|---|---|---|---|
| 5,739,912 A | * | 4/1998 | Ishii .................. 219/124.34 |
| 6,023,044 A | * | 2/2000 | Kosaka et al. .......... 219/124.34 |
| 6,040,554 A | * | 3/2000 | Terada et al. .......... 219/124.34 |
| 2003/0108234 A1 | * | 6/2003 | Fujita et al. .............. 382/141 |

FOREIGN PATENT DOCUMENTS

| | | | | |
|---|---|---|---|---|
| JP | 1-99779 S | * | 4/1989 | |
| JP | 3-251379 A | * | 11/1991 | |
| JP | 7-104831 A | | 4/1995 | |
| JP | 7-141016 A | | 6/1995 | |
| JP | 10-80768 A | * | 3/1998 | |
| JP | 2002-39308 A | * | 2/2000 | |

* cited by examiner

CONTROL SYSTEM USING WORKING ROBOT, AND WORK PROCESSING METHOD USING THIS SYSTEM

CROSS REFERENCE TO RELATED APPLICATION

This application is a National Stage entry of International Application No. PCT/JP2004/001224, filed Feb. 5, 2004, the entire specification claims and drawings of which are incorporated herewith by reference.

TECHNICAL FIELD

The present invention relates to control systems using a working robot which is supposed to do e.g. a welding operation. The present invention also relates to work processing methods using this control system.

BACKGROUND ART

Conventional working robots include a welding robot which performs arc welding to join a plurality of work pieces with each other. To control the welding robot, so called teaching-and-playback method is often employed. In this method, a path along a planned welding line on the work is preset by a human operator as instruction information for the welding torch to follow, and this instruction information is utilized for the welding operation performed by the welding torch (JP-A 7-104831 gazette). Another method is to use laser sensors to sense welding positions whereby a path along a planned welding line on the work is preset as instruction information for the welding torch to follow, and this instruction information is utilized for the welding operation to be performed by the welding torch.

Figure 12:
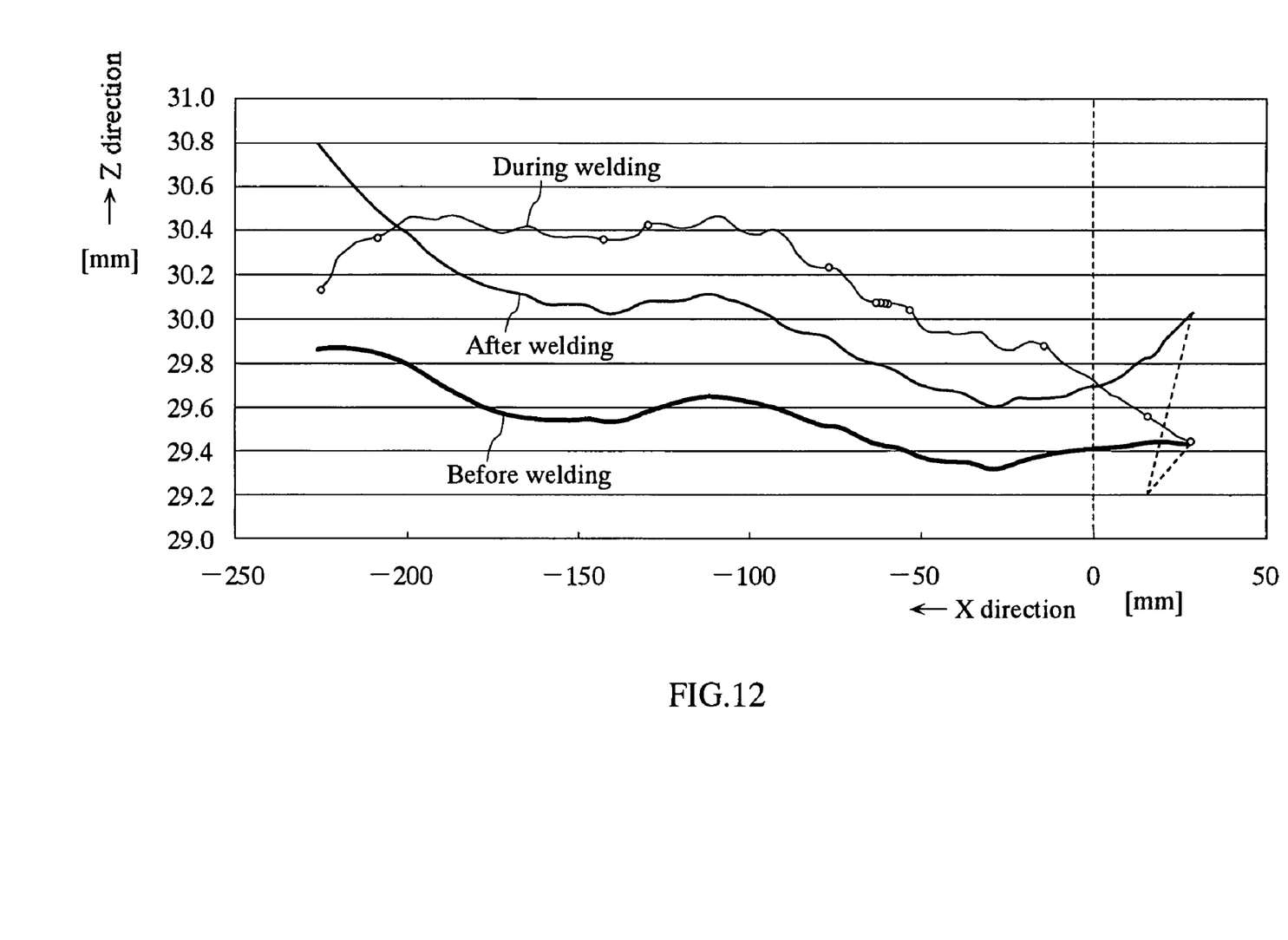
FIG. 12 shows a work W before, after and during a welding operation.

However, in e.g. arc welding which is performed by using a welding torch, it is common that the welding line on the work becomes slightly different topographically or otherwise, before and after the welding. In fact, there are slight differences even between before and during, as well as during and after the welding operation. FIG. 12 shows how a welded region changed in the direction of its height before, during and after an arc welding operation. The measurements were made as the welding torch was moved. As shown in the figure, during the welding, the welding heat causes surface shape change in the work and therefore the surface of the work is formed slightly higher than before or after the welding. Thermal shape change in the work is known to be reproducible if the shape, thickness, and the method of fixation of the work are known.

The welding method disclosed in the above-mentioned gazette does not take into account the shape change in the work during the welding caused by heat. Therefore, even if a plurality of instruction points are set accurately based on pre-welding and post-welding surface conditions, and the welding is made along the path defined by the instruction points, there is still a problem that the instruction points do not follow the shape change on the work surface during the welding, and the level of welding is not satisfactory. For example, the welding torch will enter a bulged molten during the welding, which can result in defective welding. Especially when the work is a thin plate, the work surface shape change during the welding is relatively large, which means that probability for defective welding increases substantially.

In order to tackle with this problem, conventional methods use detection of welding results during the welding so that correction can be made to the instruction points in the manner of trial-and-error. As another attempt, fixing jigs are used to fix the work very tightly. However, the method of changing instruction points in trial-and-error is heavily dependent upon the skill, experience and so on of the human operator, which means quite a few failures must be expected before the operator understands how a particular work will change. As for the other attempt, fixing the work very tightly is often very difficult if the work has a thickness of e.g. 1 mm or less, because excessive localized shape change will occur in such an extremely thin piece.

DISCLOSURE OF THE INVENTION

It is therefore an object of the present invention to provide a control system using a working robot which is capable of solving or reducing the above-mentioned problems.

A first aspect of the present invention provides a control system using a working robot. The system includes a working robot which moves processing means along a work for processing the work and control means for controlling drive of the working robot.

The control system further includes: detecting means for detecting a shape change in the work during the processing by the processing means; and obtaining means for obtaining instruction information for the working robot in accordance with the shape change based on a result of detection by the detecting means.

The controlling means moves the processing means through the drive control to the working robot, based on the instruction information obtained by the obtaining means.

Preferably, the obtaining means obtains data of a plurality of points representing the shape change in the work being processed, as data for candidate instruction points, and deletes part of the data which represents points satisfying a predetermined straight-line approximation condition, thereby making instruction information including data of a plurality of points.

Preferably, the obtaining means obtains data of a plurality of points representing the shape change in the work being processed, as data for candidate instruction points, and deletes part of the data which represents points satisfying a predetermined arc-line approximation condition, thereby making instruction information including data of a plurality of points.

A second aspect of the present invention provides a control system using a working robot. The system includes a working robot which moves welding means along a work for welding the work and control means for controlling drive of the working robot.

The control system further includes: detecting means for detecting a shape change in the work during the welding by the welding means; and obtaining means for obtaining instruction information for the working robot in accordance with the shape change based on a result detection by the detecting means.

The controlling means moves the welding means through the drive control to the working robot, based on the instruction information obtained by the obtaining means.

A third aspect of the present invention provides a work processing method by means of a control system using a working robot. The control system includes a working robot which moves processing means along a work for processing the work, and control means for controlling driving of the working robot.

The method includes: a first stage of having the processing means perform a rehearsal processing to a test work for detection of a shape change in the work during the processing;

a second stage of obtaining instruction information for the working robot based on the shape change detected in the test work in the first stage; and a third stage of processing others of the work than the test work, based on the instruction information obtained in the second stage.

A fourth aspect of the present invention provides a work processing method by means of a control system using a working robot. The control system includes a working robot which moves welding means along a work for welding the work, and control means for controlling driving of the working robot The method includes: a first stage of having the welding means perform a rehearsal welding to a test work for detection of a shape change in the work during the welding;

a second stage of obtaining instruction information for the working robot based on the shape change detected in the test work in the first stage; and a third stage of welding others of the work than the test work, based on the instruction information obtained in the second stage.

Other characteristics and advantages of the present invention will become clearer from the following description of an embodiment of the present invention.

BEST MODE FOR CARRYING OUT THE INVENTION

Hereinafter, a preferred embodiment of the present invention will be described specifically, with reference to the drawings.

Figure 1:
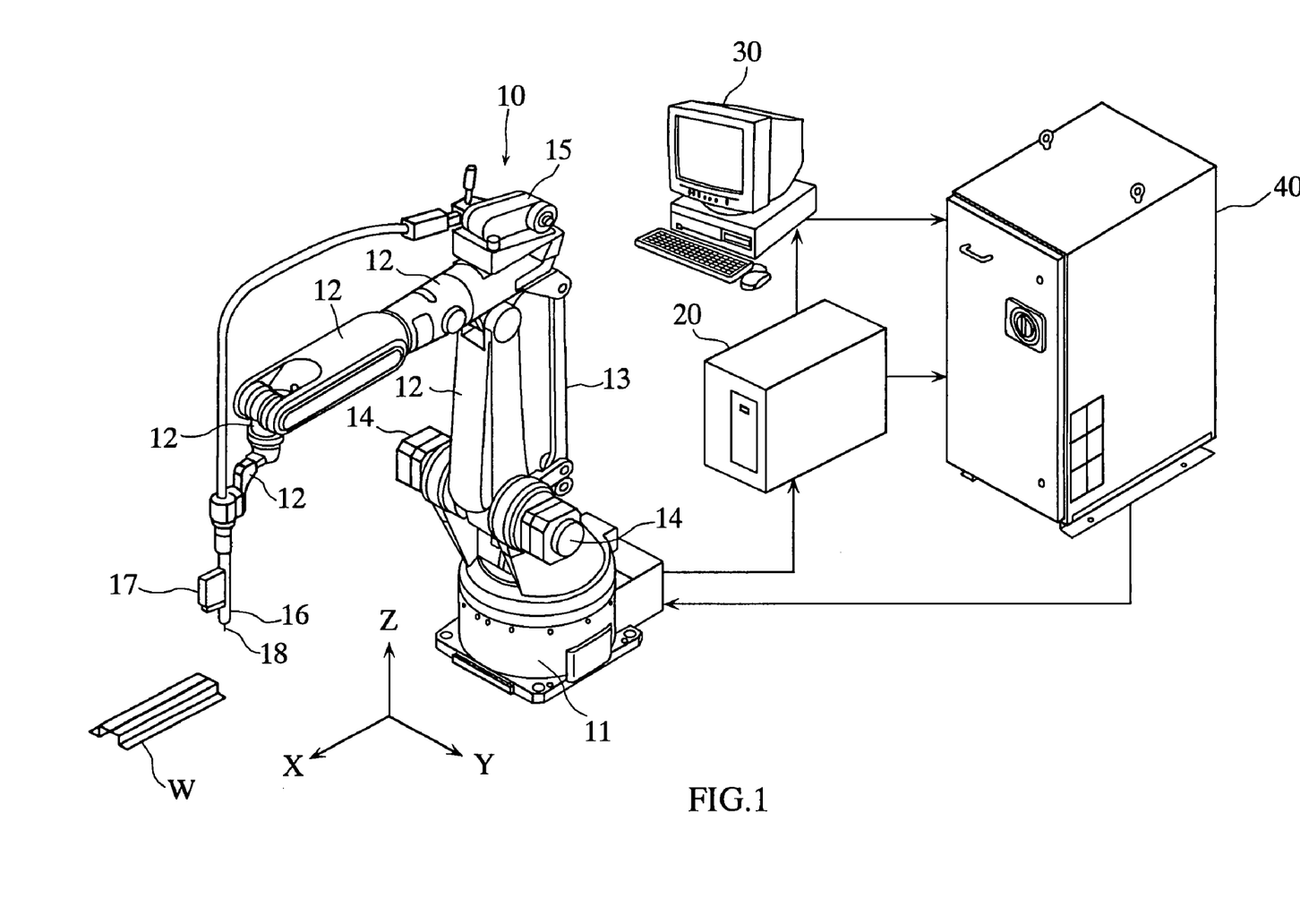
FIG. 1 is a configuration diagram of a control system using a working robot, according to the present invention.

FIG. 1 is a configuration diagram of a control system using a working robot, according to the present invention. In this control system, the working robot is provided by a welding robot which welds a plurality of work pieces (welding objects) with each other. In FIG. 1, a horizontal direction is represented by Direction X, and a direction perpendicular to Direction X is represented by Direction Y, whereas the vertical direction is represented by Direction Z.

The control system generally includes a welding robot 10, a sensor controller 20, a personal computer 30 (which serves as obtaining means according to the present invention) and a robot controller 40 (which serves as controlling means according to the present invention).

Figure 2:
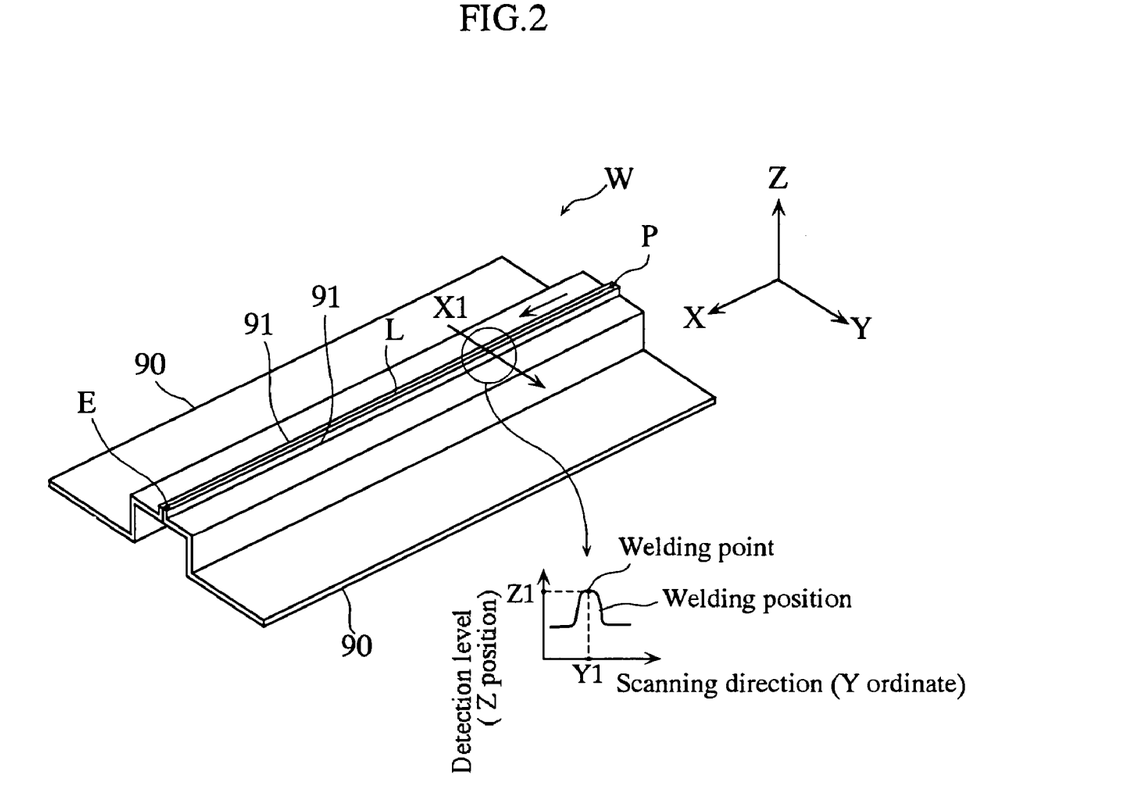
FIG. 2 is a perspective view showing an example of work.

The present embodiment uses a work W as shown in FIG. 1 and FIG. 2, which is a pair of metal plate members 90 each having an L-shaped section, as an example of work to which processing (welding) is to be performed. The metal plate members 90 are butted together on their upright ends. The metal plate members 90 will have an upper edge of their butted upright ends 91 welded by the welding robot 10. For example, as shown in FIG. 2, the work W has a welding line L which begins at a starting point P and ends at an ending point E, and the metal plate members 90 are welded together by a welding torch to be described later, which moves along the welding line. The metal plate members 90 are made of stainless steel for example, and each has a thickness of about 0.5 mm. Note, however, that the work W may have a different shape from the shape shown in FIG. 2.

Returning to FIG. 1, the welding robot 10 performs arc welding for example, automatically to the work W. The welding robot 10 generally includes a base member 11 fixed to an appropriate place such as a floor, a plurality of arms 12 connected thereto via a plurality of shafts, a link member 13, a plurality of motors 14 (not all are shown), and a wire feeder 15. In the welding robot 10, the arm 12 at the tip of the entire arm structure is provided with a welding torch 16 (which serves as processing means or welding means according to the present invention) and a laser sensor head 17 (which serves as detecting means according to the present invention).

The robot controller 40 provides drive control to the welding robot 10. The welding torch 16, driven by the motors 14 and so on, is movable in Directions X, Y and Z indicated in FIG. 1.

The welding torch 16 has within itself a wire 18 which serves as a filler and has a diameter of 1 mm for example. The welding torch 16 creates an arc between the tip of the wire 18 supplied by the wire feeder 15 and the work W, thereby melting the wire 18 to weld a pair of work pieces W together.

The laser sensor head 17 detects the shape of a region including the welding point on the work W, by means of laser. The laser sensor head 17 is attached to an outer surface of the welding torch 16. More specifically, the laser sensor head 17 is attached on a side of the welding torch 16 along a direction of welding (Direction X). The laser sensor head 17 applies a laser beam to the work W, receives a reflected beam, and thereby detects the shape of the work W as two-dimensional information. More specifically, the laser sensor head 17 scans in Direction Y, as the welding torch 16 moves in the Direction X in FIG. 2, at a predetermined timing (at a predetermined pitch in Direction X), whereby the laser sensor head 17 detects an outer shape of the work W in the ZY plane, at each of the scanning point. For example, at a scanning point X1, the sensor head outputs a square pulse signal representing the outer shape of the work W in the ZY plane. The work W shape information detected by the laser sensor head 17 is fed to the sensor controller 20.

The sensor controller 20 receives shape information of the work W detected by the laser sensor head 17 at each scanning point, performs image processing, and thereby extracts a welding point of the welding torch 16 from the shape information. More specifically, the sensor controller 20 extracts the welding point (Y1, Z1) from signal waveform of the square pulse signals outputted from the laser sensor head 17. The sensor controller 20 extracts the welding point of the welding torch 16 for all scanning points, converts the position information into coordinate information in Directions X, Y and Z, and sends the information to the personal computer 30 and the robot controller 40.

The personal computer 30 generates instruction-point data, based on the coordinate information about the welding points of the welding torch 16 sent from the sensor controller 20, and gives the generated data to the robot controller 40. The "instruction-point data" is coordinate information which defines a path for the welding torch 16 to move on, with a plurality of three-dimensional points and an attitude of the welding torch 16 at each of the points.

The robot controller 40 controls movement of the welding robot 10. The robot controller 40 controls the motors 14, etc. of the welding robot 10 based on the coordinate information from the sensor controller 20 and the instruction-point data from the personal computer 30, thereby moving the welding torch 16 along the welding area in the work W.

Figure 3:
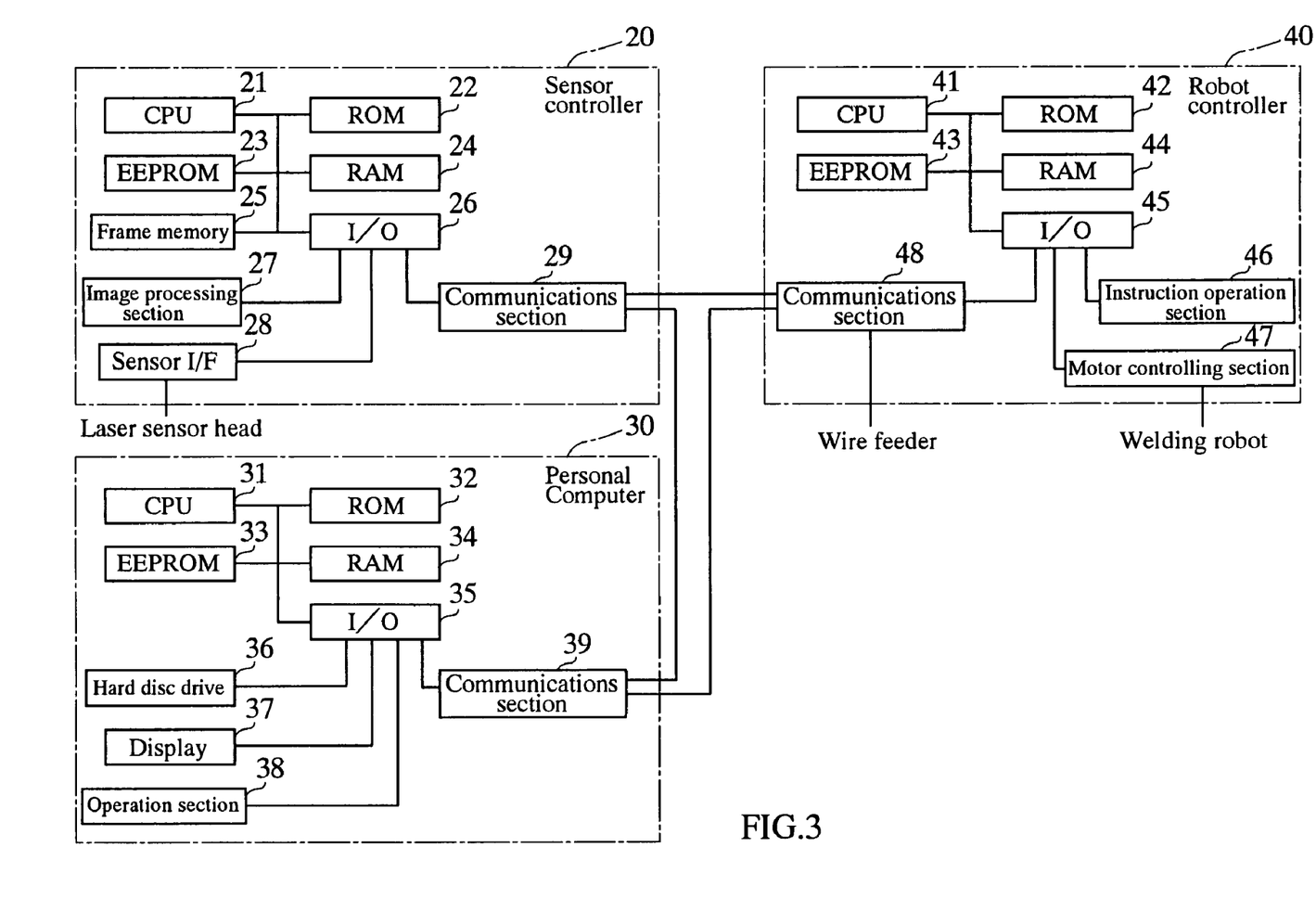
FIG. 3 shows electrical configuration of a sensor controller, a personal computer, and a robot controller.

FIG. 3 shows electrical configurations of the sensor controller 20, the personal computer 30, and the robot controller 40.

The sensor controller 20 has a CPU 21, a ROM 22, an EEPROM 23, a RAM 24, a frame memory 25, and an I/O 26, and they are all connected by a bus. The I/O 26 is connected with an image processing section 27, a sensor I/F 28 and a communications section 29

The CPU 21 controls the sensor controller 20, and provides control based on operation programs and so on stored in the ROM 22. The ROM 22 stores the operation programs and various kinds of data. The EEPROM 23 stores data indicating welding points for the welding torch 16. The RAM 24 provides a work area for the CPU 21. The frame memory 25 stores image data which are detected by the laser sensor head 17 as shape data, in the form of frame data.

The image processing section 27 performs image processing on the shape data detected by the laser sensor head 17. The sensor I/F 28, which is connected with the laser sensor head 17, serves as an AD converter and thus converts the shape data which is sent from the laser sensor head 17 in the form of analog signals into digital signals The communications section 29 controls communications with the personal computer 30 and the robot controller 40.

The personal computer 30 has a CPU 31, a ROM 32, an EEPROM 33, a RAM 34, and an I/O 35, and they are all connected by a bus. The I/O 35 is connected with a hard disc drive 36, a display section 37 which includes a liquid crystal display, an operation section 38 including a keyboard, etc., and a communications section 39.

The CPU 31 controls the personal computer 30, and provides control based on operation programs stored in the ROM 32 as well as operation signals from the operation section 38 inputted by the user. The ROM 32 stores the operation programs and various data. The EEPROM 33 stores generated instruction-point data, etc. The RAM 34 provides a work area for the CPU 31.

The hard disc drive 36 stores coordinate information, etc. from the sensor controller 20. The display section 37 displays e.g. processing status when generating instruction-point data. The operation section 38 is for various inputs for generation of instruction-point data. The communications section 39 controls communications with the sensor controller 20 and the robot controller 40.

The robot controller 40 has a CPU 41, a ROM 42, an EEPROM 43, a RAM 44, and I/O 45, and they are all connected with a bus. The I/O 45 is connected with an instruction operation section 46 which includes a keyboard and a display (neither is illustrated), a motor controlling section 47 connected with the welding robot 10, and a communications section 48.

The CPU 41 controls the robot controller 40, and provides control based on operation programs stored in the ROM 42 as well as operation signals from the instruction operation section 46 inputted by a human operator. The ROM 42 stores the operation programs and various data. The EEPROM 43 stores instruction-point data and various setting values sent from the personal computer 30. The RAM 44 provides a work area for the CPU 41.

The instruction operation section 46 allows various inputs including instruction-point data for the working robot 10, commands for automatic operation, and setting of welding points (coordinate information) for the welding torch 16. The motor controlling section 47 controls the number of revolutions, rotation angles, etc. of the motors 14 in the working robot 10, based on the instruction-point data for example. The communications section 48 controls communication with the sensor controller 20 and the personal computer 30. The communications section 48 is connected with the wire feeder 15. The wire feeder 15 supplies the wire 18 to the welding torch 16 based on commands from the CPU 41.

Next, functions according to the above-described configuration will be depicted.

Figure 4:
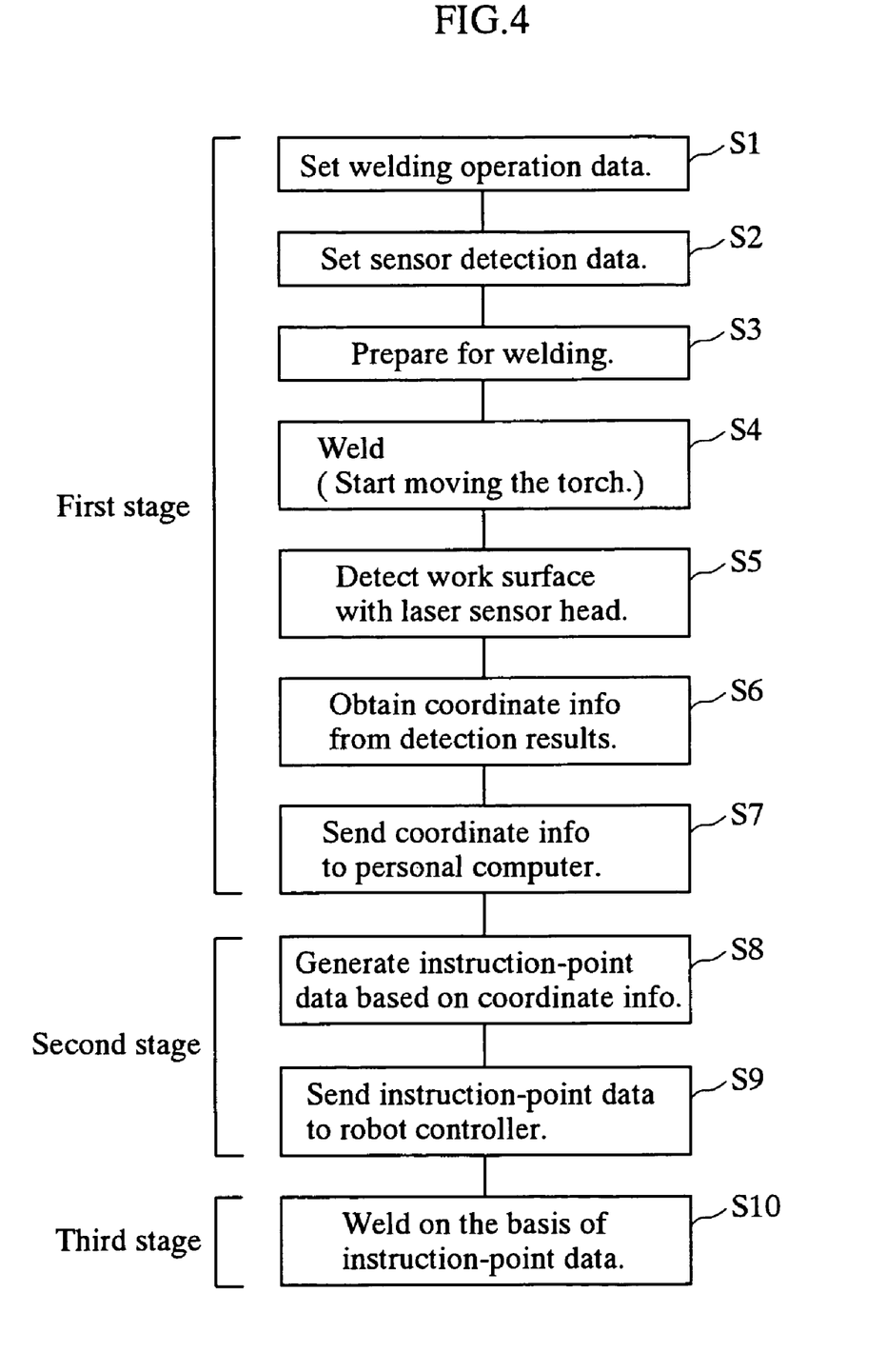
FIG. 4 is a process chart showing a method of welding according to the present control system.

A welding method according to the present embodiment includes, as shown in FIG. 4, a first stage in which a rehearsal welding operation is made to a pair of work pieces W which is one of many identical pairs of the work pieces W, a second stage in which instruction-point data are obtained from the rehearsal welding operation, and a third stage in which welding is done at a mass production level based on the obtained instruction-point data, to the remaining pairs of work pieces W other than the test work W.

In the first stage, a human operator for example, operates the instruction operation section 46 of the robot controller 40, to enter initial setting data such as welding execution data for the welding robot 10 and sensor detection data for the laser sensor head 17 (step S1, S2). The "welding execution data" refers, for example, to data representing a welding starting point on the work W (e.g. the starting point P in FIG. 2), data representing a welding line on the work W, data representing an ending point (e.g. the ending point E in FIG. 2), moving speed of the welding torch 16, feeding speed of the wire 18, a welding voltage and a welding current to be supplied to the welding torch 16, and other data necessary for a rehearsal welding operation. The "sensor detection data" refers to such data as representing the attitude of the welding torch 16 (e.g. an angle to the work W) during the welding.

After the entry of initial setting data, the robot controller 40 starts welding of a test work W. Specifically, the robot controller 40 controls the motor controlling section 47, thereby drives motors 14, etc. in the welding robot 10, to move the tip of welding torch 16 onto the starting point P (Step S3).

Next, the robot controller 40 sends commands to the wire feeder 15, whereby welding begins (step S4). The welding torch 16 moves along a predetermined welding line on the work W extending in Direction X (See FIG. 2). During this, the laser sensor head 17 detects surface shape changes on the work W in the course of the welding (step S5).

Specifically, as the welding torch 16 moves in Direction X, the laser sensor head 17 throws a laser beam to the work W, for scanning at a pitch of e.g. 20 times per second in Direction Y in FIG. 2 (in a direction generally perpendicular to the moving direction of the welding torch 16), and by receiving a reflected beam detects shape changes of the work W in Direction Y at each scanning point. The laser sensor head 17 outputs the detection signals (the square pulse signals in FIG. 2) to the sensor controller 20, as it is detected.

The sensor controller 20 accumulates the shape information (image data) from the laser sensor head 17, in the frame memory 25 while having the image processing section 27 perform image processing. Based on the image data after the image processing, the CPU 21 of the sensor controller 20 calculates coordinate information of a welding line of the welding torch 16 in Directions X, Y and Z (step S6). The CPU 21 gives this coordinate information to the robot controller 40 and the personal computer 30 via the communications section 29 (step S7). As the welding torch 16 reaches the end-of-welding position, the welding operation to the test work W comes to an end.

Upon completion of the first stage, the second stage commences to obtain instruction-point data based on the rehearsal welding operation. The personal computer 30 which has obtained the coordinate information of the welding robot 10 from the sensor controller 20 via the communications section 39, then generates instruction-point data (step S8). The instruction-point data are used when welding mass production works W. Description will be given later on how to generate the data.

Next, the personal computer 30 gives the generated instruction-point to the robot controller 40 via the communications section 39 (step S9). The second stage may be made simultaneously with the first stage while the rehearsal welding operation is being made.

Next, upon completion of the second stage, the third stage begins welding of mass production works W. In the third stage, welding is made to the mass production works W, based on the instruction-point data obtained from the test work W through the rehearsal welding operation (step S10).

Specifically, the robot controller 40 uses the instruction-point data supplied from the personal computer 30 via the communications section 48 in its control operation of the motor controlling section 47 to drive the motors 14, etc. in the welding robot 10, thereby moving the welding torch 16, and sends commands to the wire feeder 15, thereby commencing welding. This time, the tip of the welding torch 16 is moved also along the welding line in Direction Z in the instruction-point data. In other words, as shown in FIG. 12, the tip of the welding torch 16 is moved along a welding line which follows the surface of the work W as changed during the welding. Alternatively, the tip of the welding torch 16 may be moved as spaced from the welding line by a predetermined distance in Direction Z.

As described, according to the present embodiment, a laser sensor head 17 detects actual shape changes during the welding of a work W, then, instruction-point data are obtained based on the detected shape information, and the instruction-point data are utilized in the welding of mass production works W.

Conventionally, as has been described, shape changes of a work W during the welding is not taken into consideration, and therefore instruction points do not follow the changed surface of the work W during the welding, and this sometimes is a cause of defective welding.

According to the present embodiment, however, shape changes of the work W during the welding operation is taken into account and the welding is based upon instruction-point data obtained on the basis of these changes. Therefore, during a welding operation for example, the welding torch 16 will not enter a bulged welding area of the work W while being moved, and thus good welding is ensured, and it is possible to achieve highly reliable, high quality welding.

Further, according to the present embodiment, instruction points, which have been obtained on a trial-and-error basis, can be obtained as number data, and therefore it becomes possible to standardize the operation procedure. Thus, it becomes possible to improve operation efficiency and dramatically reduce cost of operation.

It should be noted here that there is no need for using the laser sensor head 17 in welding the mass production works W. The laser sensor head 17 is relatively highly priced in the market since it includes special optical components. When it is difficult to equip all welding robots 10 with a laser sensor head 17, the laser sensor head 17 may be attached only in a rehearsal welding operation when a welding robot 10 obtains instruction-point data. For example, when welding mass production works W, the laser sensor head 17 may be removed from the welding robot 10 so that the sensor head can be used for different purposes. In this way, the laser sensor head 17 can be used effectively, and the welding can be made at a low total cost.

Now, description will be made on how the personal computer 30 generates instruction-point data, with reference to FIG. 5 and FIG. 6A through FIG. 6D.

Figure 5:
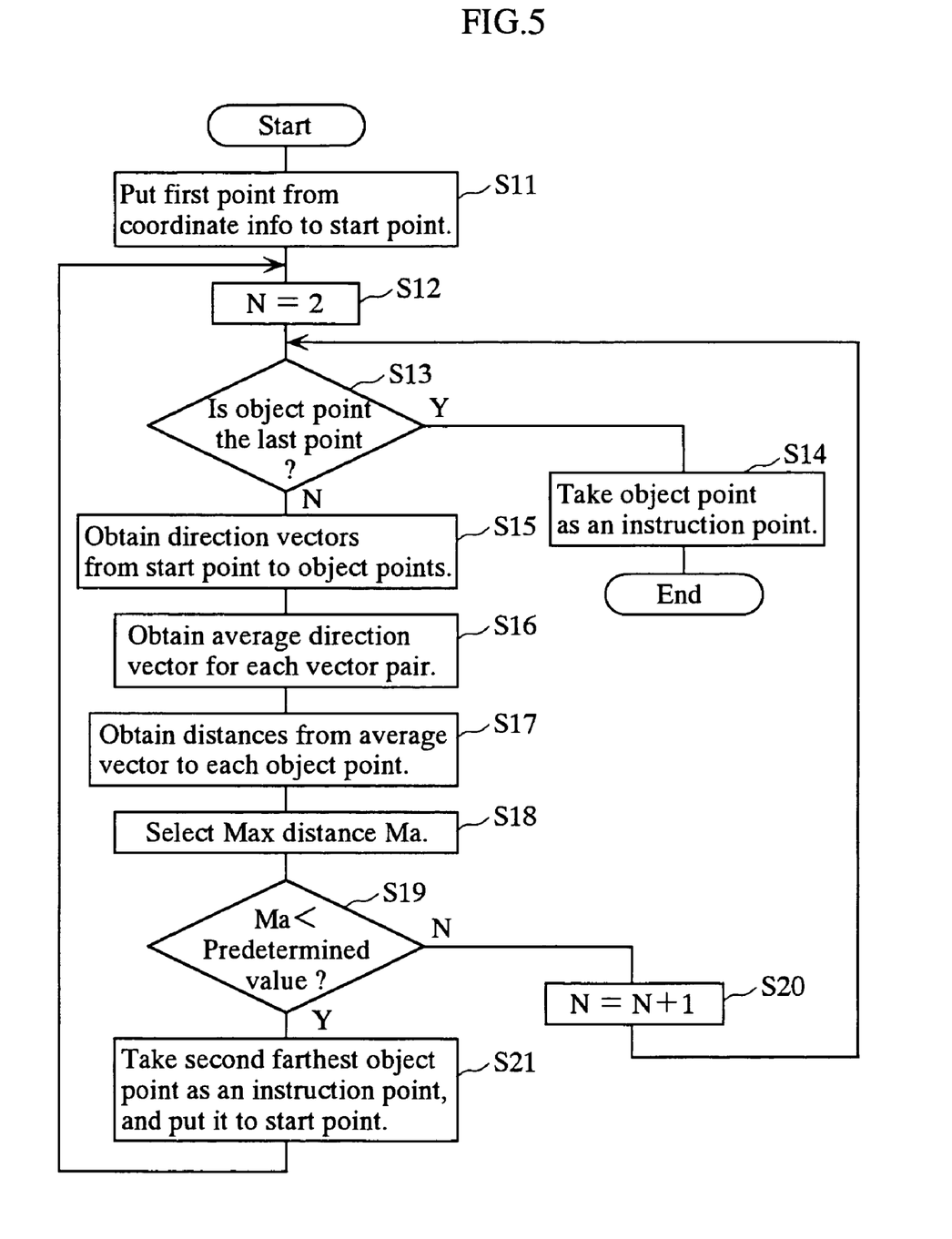
FIG. 5 is a flowchart showing a control process in the personal computer for generation of instruction-point data.

After receiving coordinate information detected by the laser sensor head 17 during a rehearsal welding operation from the sensor controller 20, the CPU 31 in the personal computer 30 places, as shown in FIG. 5, the first point $P_0$ of the coordinate information on a starting point (step S11), and give a variable N a value "2" (step S12). The "variable N" represents the number of target points in the generation of instruction-point data. In this example, the value of N=2, and therefore the target points include two points $P_1$ and $P_2$ in FIG. 6A.

Next, the CPU 31 checks if the target point is the last point in the coordinate information (step S13). If the target point is the last point in the coordinate information (step S13: YES), the last point in the coordinate information is recognized as instruction-point data (step. S14). The CPU 31 stores the instruction-point data in the EEPROM 33 and brings the present procedure to an end.

Figure 6A:
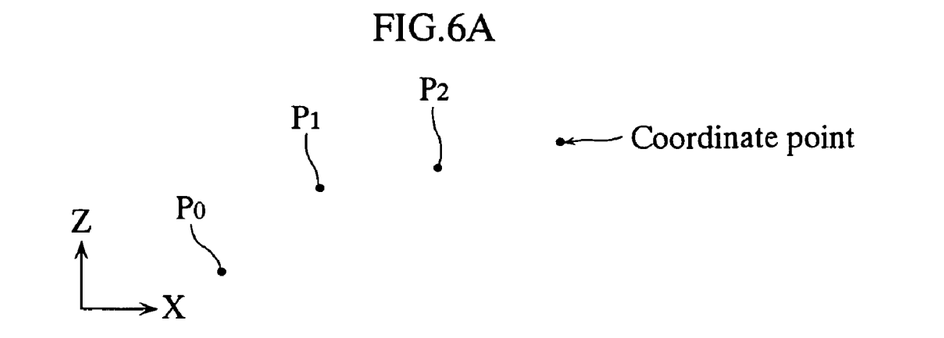
FIG. 6A through FIG. 6D illustrate how instruction-point data are generated.
Figure 6B:
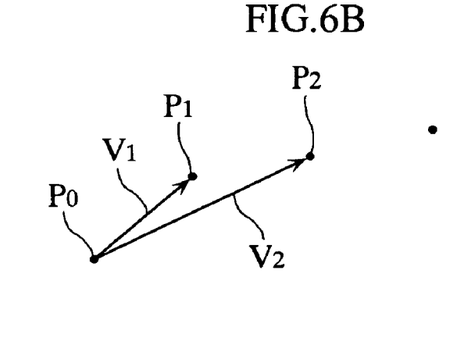

On the other hand, if the target point is not the last point in the coordinate information (step S13: NO), the CPU 31 obtains, as shown in FIG. 6B, direction vectors $V_1$, $V_2$ from the starting point $P_0$ to the target points $P_1$, $P_2$ (step S15).

Figure 6C:
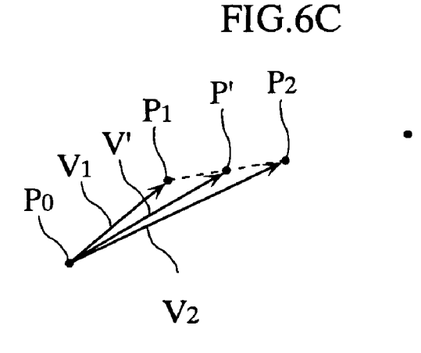

Next, as shown in FIG. 6C, the CPU 31 obtains a direction vector V' (hereinafter called "average direction vector") which is an average of the direction vectors $V_1$, $V_2$ (step S16). The average direction vector V' is on a straight line which passes through the starting point $P_0$ and the middle point P' between the target points $P_1$, $P_2$.

Figure 6D:
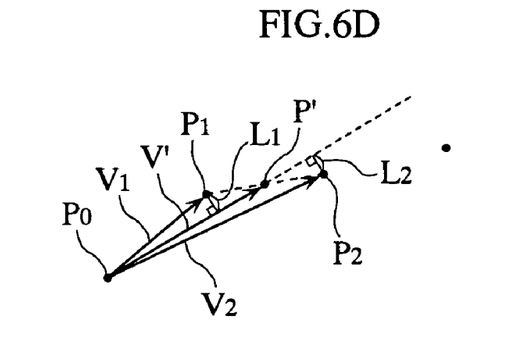

Next, as shown in FIG. 6D, the CPU 31 calculates distances $L_1$, $L_2$ from the average direction vector V' (or an extension thereof) to the respective target points $P_1$, $P_2$ (step S17), and selects the largest value or a maximum distance Ma from the distances $L_1$, $L_2$ (step S18). The CPU 31 then checks if the maximum distance Ma is equal to or greater than a predetermined value (step S19). If the maximum distance Ma is not equal to or not greater than the predetermined value (step S19: NO) the CPU increases the number of target points by one (step S20), and brings the process back to step S13. In other words, an additional target point is brought in and the same procedure is made again.

If the maximum distance Ma is equal to or greater than the predetermined value (step S19: YES), the farthest of the target points from the starting point $P_0$ is picked as a reference target point and a target point which is closest to the reference target point and is closer to the starting point $P_0$ than the reference target point is selected as an instruction point. And then, this particular target point is recognized as a new starting point $P_0$ (step S21). In other words, the CPU 31 stores coordinate information of this particular target point as instruction-point data in the EEPROM 33, and then brings the procedure back to step S12. The CPU 31 repeats the above-described procedure until it finds the target point is the last point (step S13:

YES), where this particular target point is stored as instruction-point data in the EEPROM 33 (step S14), and the instruction-point data generation procedure comes to an end.

In the above-described procedure, the loop from step S15 through S20 is a procedure whereby the shape of the work W obtained through the rehearsal welding operation is approximated by straight lines, and a connection point of two straight lines is picked as instruction-point data. The procedure such as this has advantages of reducing instruction-point data as much as possible, reducing required memory capacity for the instruction-point data, and simplifying welding operation control over the welding torch 16 based on the instruction-point data. The procedure is especially effective if welding points on the work W forms a somewhat rectangular shape constituted by a combination of straight lines.

Figure 7:
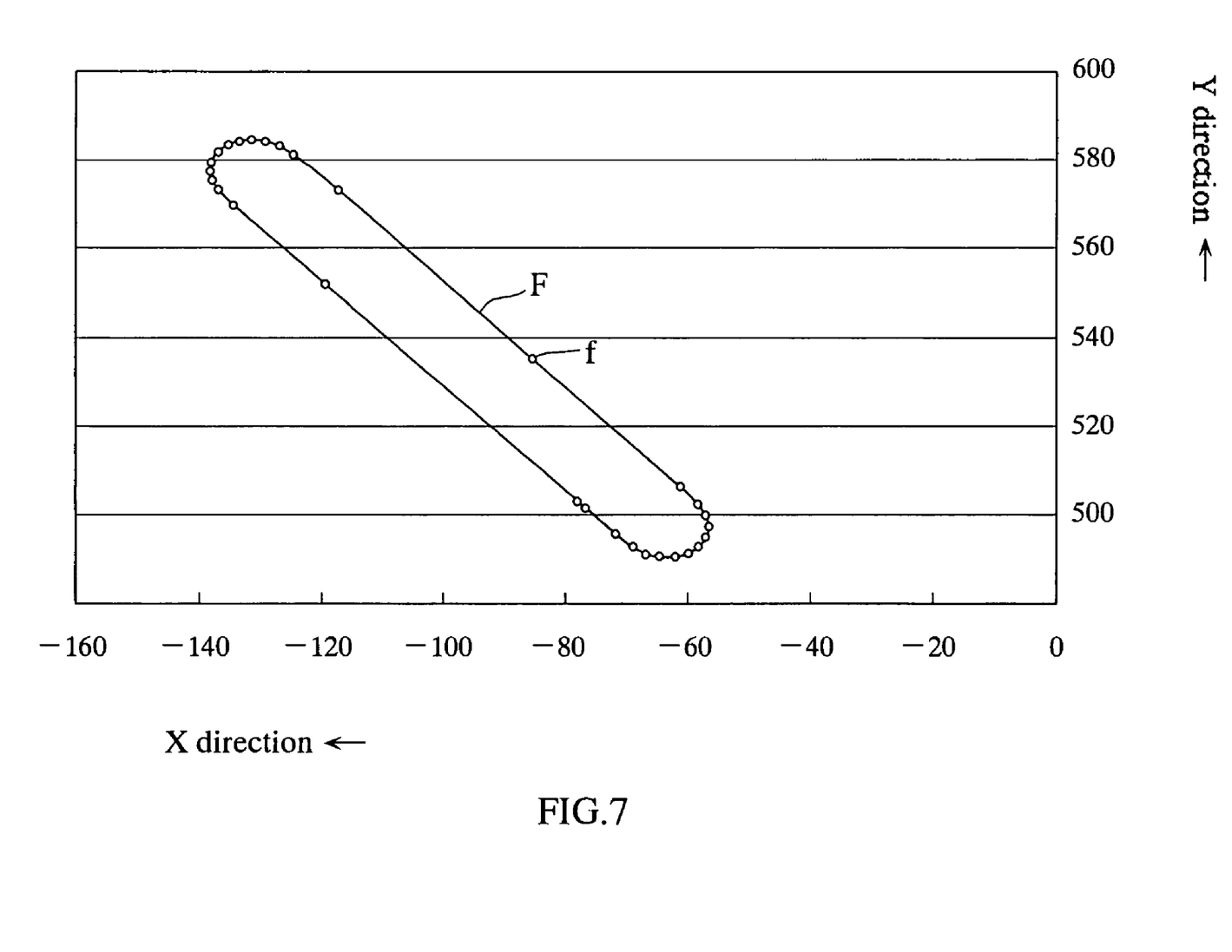
FIG. 7 shows an example of instruction-point data.

FIG. 7 shows an example of instruction-point data generated by a CPU 31 of a personal computer 30. In this figure, solid lines F represent the shape of work W, and points f represent instruction points generated. According to the figure, a pitch between two mutually adjacent instruction-point data are long in the shape of the work W represented by straight lines whereas the pitch between two mutually adjacent instruction-point data are short on arcs.

As understood, if coordinate points are located generally straightly, not all coordinate points are taken as instruction-point data, and some coordinate points (in each of the straight lines) are removed (skipped). Since the welding torch 16 moves from one instruction point to the next-and-closest instruction point by skipping the removed coordinate points if the coordinate points generally lie on a straight line, the welding torch 16 can move more smoothly than otherwise.

Assume a method, for example, where there is a plurality of coordinate points and a coordinate point is picked as an instruction point at every predetermined interval. Here, even if a multiple of coordinate points lie on a straight line, every coordinate point picked at every interval is stored as instruction-point data. On the contrary, according to the present embodiment, unnecessary coordinate points (those lying on the same straight line) are removed, and thus, it is possible to provide a path for the welding torch 16, using a minimum amount of instruction-point data. This enables to prevent the instruction-point data from increasing in size, as well as to reduce required memory capacity. Also, the amount of data to be handled is the smallest possible, so it becomes possible to simplify control procedures made by the software.

In addition to the above-described procedure, another procedure which uses approximation by arc may be used in the obtainment of instruction information. Specifically, in the above-described procedure, approximation of the path of the welding torch 16 is made by straight line, but when the path of the welding torch 16 is arc-shaped, an arc path may be used as instruction information.

Figure 8:
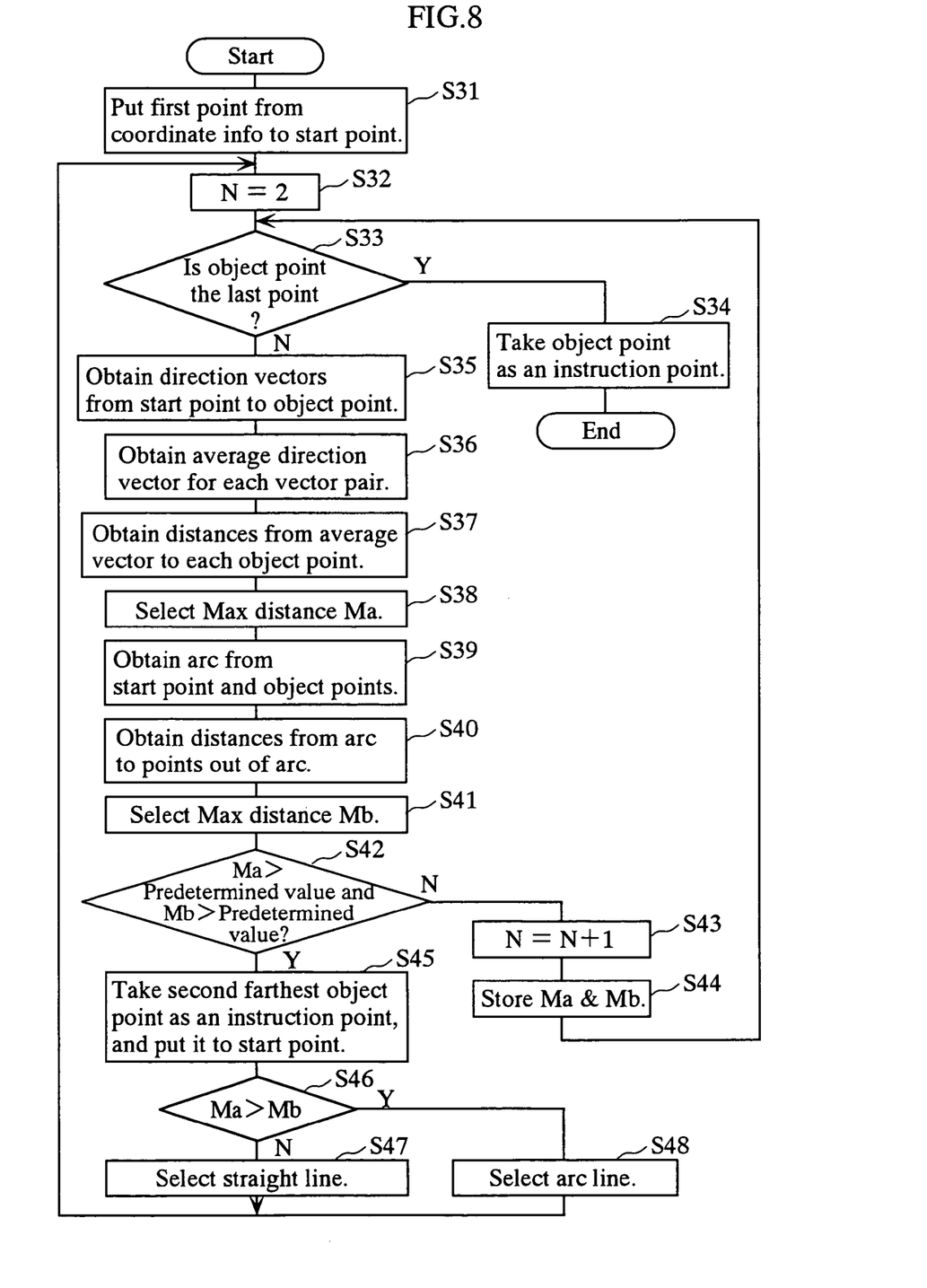
FIG. 8 is a flowchart showing a control process in the personal computer for generation of instruction-point data.

FIG. 8 is a flowchart of a control procedure which includes a determination whether or not arc approximation is utilized in the generation of instruction-point data. It should be noted here that in the control procedure shown in FIG. 8, operations in steps S31 through S38 are the same as in step S11 through S18 in FIG. 5, and therefore will not be explained again in the following description.

Figure 9:
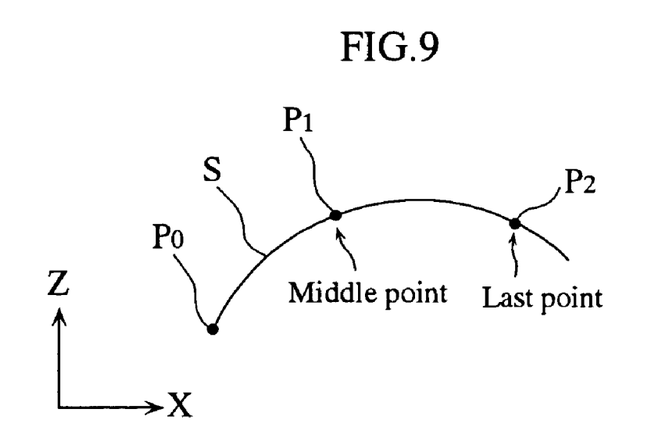
FIG. 9 illustrates how instruction-point data are generated.

In step S38, a maximum distance Ma is obtained between an average direction vector and a target point. In step S39, an arc is obtained based on a starting point and the target point. Specifically, if the number of target points N is 2 (See step S32), i.e. if there are, as shown in FIG. 9, a starting point $P_0$ and two target points $P_1$, $P_2$, an arc S which passes all of the starting point $P_0$ and the two target points $P_1$, $P_2$ is selected, and the center and the radius of the arc S are obtained.

Next, the CPU 31 obtains distances between the arc S and target points which do not lie on the arc S (step S40), and then selects a maximum distance Mb from the distances between the arc S and those target points which are not on the arc S (step S41). In the example in FIG. 9, all of the starting point $P_0$ and two target points $P_1$, $P_2$ are passed by the arc S, so there is no target point which lies on the arc S, and therefore no maximum distance Mb is selected.

Next, the CPU 31 checks if a predetermined value is exceeded by the maximum distance Ma between the average direction vector and the target point or by the maximum distance Mb between the arc S and the target point (if the maximum distance Mb is selected) (step S42). If the maximum distance Ma or the maximum distance Mb is not greater than the predetermined value (step S42: NO), the number of target points is increased by one (step S43), the maximum distance Ma and the maximum distance Mb are temporarily stored in the EEPROM 33 (step S44), and the procedure is brought back to step S33. In other words, an additional target point is brought in and the same procedure is made again.

From here, description for step S39 and thereafter will cover a case where the number N of the target points is three or greater. When the number N of the target points is three or greater, an arc is obtained from the starting point, the last of the three target points (the farthest from the starting point), and a middle target point (hereinafter called "middle point") which is in the middle between the starting point and the last point.

Figure 10A:
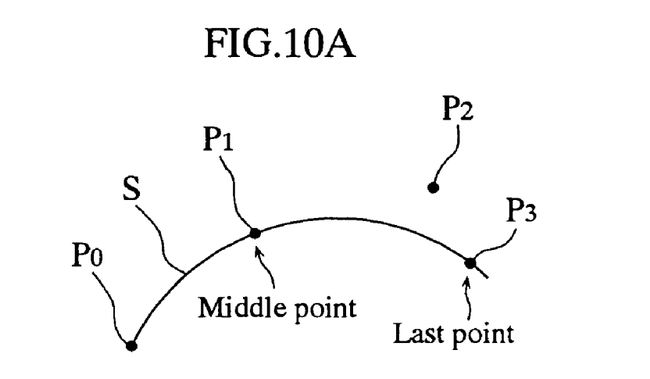
FIG. 10A and FIG. 10B illustrate how instruction-point data are generated.
Figure 10B:
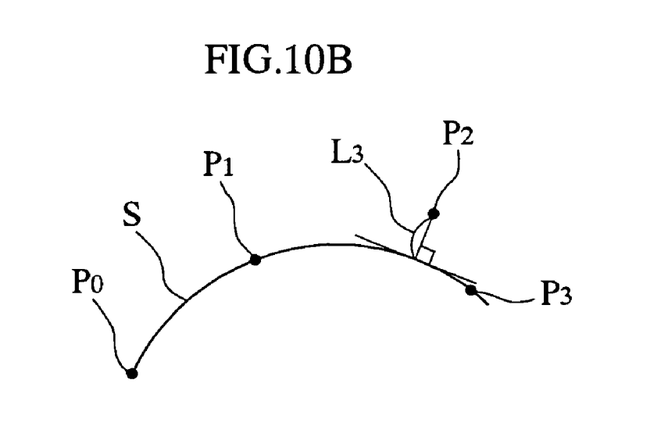

More specifically, as shown in FIG. 10A, when there are a starting point $P_0$ and three target points $P_1$ through $P_3$, the target point $P_1$ or the target point $P_2$ is taken as the middle point, the target point $P_3$ is taken as the last point, and then an arc S is selected which passes the starting point $P_0$, the middle point (let's say, the target point $P_1$), and the last point $P_3$, and then the center and the radius of the arc S are obtained. Next, a distance between the arc S and the target point $P_2$ which is not on the arc S is obtained (See FIG. 10B), for selection of a maximum distance Mb from the distances between the arc S and the target points which are not on the arc S. In FIG. 10B, there is only one target point or the target point $P_2$ which is not on the arc S, so a distance L3 between the arc S and the target point $P_2$ is picked as the maximum distance Mb.

Figure 11A:
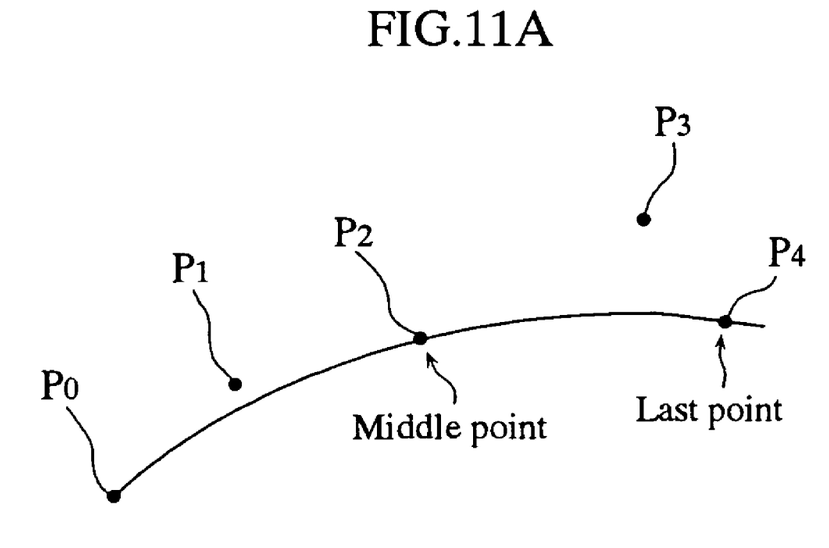
FIG. 11A and FIG. 11B illustrate how instruction-point data are generated.
Figure 11B:
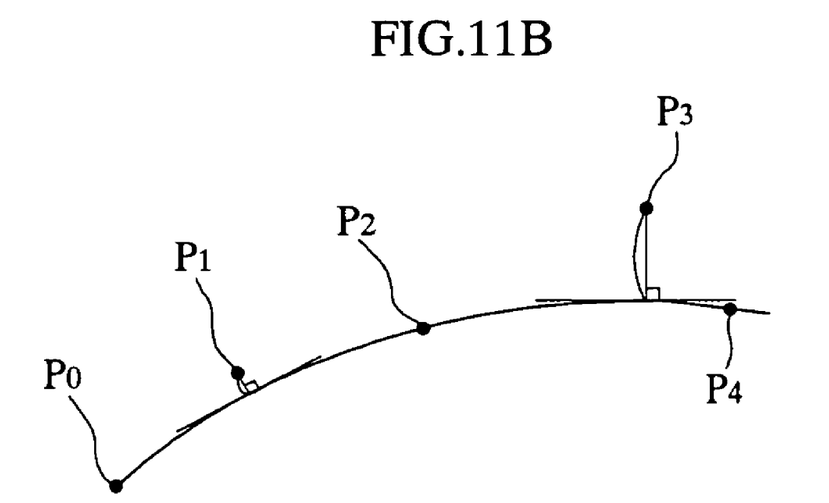

Similarly, as shown in FIG. 11A, if there are a starting point $P_0$ and four target points $P_1$ through P4, the target point $P_2$ is picked as the middle point, the target point $P_4$ is picked as the last point, and an arc S is selected which passes the starting point $P_0$, the middle point $P_2$, and the last point $P_4$, and the center and the radius of the arc S are obtained. Then, distances between the arc S and target points which are not on the arc S are obtained (See FIG. 11B), and a maximum distance Mb is selected from the distances between arc S and the target points which are not on the arc S. In FIG. 11B, target points which are not on the arc S are the target points $P_1$ and $P_3$. Since the target point $P_3$ has a longer distance from the arc S than does the target point $P_1$, a distance $L_4$ between the arc S and the target point $P_3$ is picked as the maximum distance Mb.

On the other hand, if both of the maximum distance Ma and the maximum distance Mb exceed the predetermined value (step S42: YES), the farthest of the target points from the starting point $P_0$ is picked as a reference target point and a target point which is closest to the reference target point and is closer to the starting point $P_0$ than the reference target point is selected as an instruction point. And then, this particular target point is recognized as a new starting point $P_0$ (step S45). In other words, the CPU 31 stores coordinate information of this particular target point as instruction-point data in the EEPROM 33.

Next, the CPU 31 checks if the value of maximum distance Ma is greater than the value of maximum distance Mb (step S46). If the value of maximum distance Ma is not greater than the value of maximum distance Mb (step S46: NO), the straight line path is selected for the welding torch 16 (step S47). On the other hand, if the value of maximum distance Ma is greater than the value of maximum distance Mb (step S46: YES), the arc path is selected in which the tip of the welding torch 16 moves along an arc line (step S48). Thereafter, procedure is brought back to Step S32.

In the above-described procedure, the loop from step S32 through S44 is a procedure whereby the shape of the work W obtained through the rehearsal welding operation is approximated by straight lines or arcs. The steps S45 through S48 select the straight-line approximation or the arc approximation, whichever has a smaller error. Therefore, by repeating the steps S32 through S48, the shape of the work W obtained through the rehearsal welding operation is approximated by a combination of straight lines and arcs, and two end points in the combined straight line as well as two end points and one middle point in the combined arc are picked as instruction-point data. The procedure such as this has advantages of reducing instruction-point data as much as possible, reducing required memory capacity for the instruction-point data, and simplifying welding operation control over the welding torch 16 based on the instruction-point data. The procedure is especially effective if welding points on the work W forms a somewhat rectangular shape constituted by a combination of straight lines.

As exemplified, using arc approximation in the obtainment of instruction information enables to reduce the number of instruction points. When a curvy movement of the welding torch 16 is expressed only by using straight line paths, straight line approximation of an arc movement of the welding torch 16 unavoidably include a certain level of errors as compared to the actual movement of the welding torch 16. However, by utilizing arc paths, it becomes possible to make truer expression of the movement of the welding torch 16, and to make more accurate reproduction of surface shape changes on the work W during the welding operation. Note, also, that the method of generating instruction points is not limited to the method described above.

The present invention is not limited to the embodiment described above, and specific constitution of each element in the control system according to the present invention may be varied in many different ways.

For example, in the above-described embodiment, a personal computer 30 is used for generation of instruction-point data. Alternatively, generation of the instruction-point data may be made by the robot controller 40. This arrangement will enable to reduce cost on facility and equipment.

Further, in the above-described embodiment, a laser sensor head 17 is utilized for detection of surface shape changes on the work W during a welding operation. The laser sensor head 17 may be replaced with a CCD camera for example, or arc sensors for detection of surface shape changes on the work W during a welding operation.

Further, in the above-described embodiment, description is made for arc welding by a welding robot, but the present invention is not limited to this. For example, the above-described control process may be applied to a cutting operation performed by a cutting robot. In this case, such a problem is anticipated that during the cutting operation, high temperatures cause shape changes in a region of the work W being cut, which prevents the cutting tool from performing as intended. The above-described control process enables the cutting tool to operate appropriately. Another area where the present invention can be applied is bonding of a resin product with another.

The invention claimed is:

1. A welding control system comprising:
   a robot which moves a welder along a work for welding the work;
   a robot controller for controlling the robot;
   a detector for detecting a shape change of a welding region of the work that results during the welding; and
   a processor for obtaining instruction information for the robot in accordance with the shape change based on the detection by the detector;
   the robot controller comprising means causing the robot to move the welder along a rehearsal welding path for a test work while causing the welder to perform rehearsal welding on the test work, said means of the robot controller also causing the robot to move the welder along a corrected welding path for another work, the corrected welding path being adjusted relative to the rehearsal welding path based on the instruction information obtained by the processor.

2. The control system according to claim 1, wherein the processor obtains data of a plurality of points representing the shape change of the welding region of the work, as data for candidate instruction points, and deletes part of the data which represents points satisfying a predetermined straight-line approximation condition for making the instruction information including data of a plurality of points.

3. The control system using a working robot according to claim 2, wherein the processor obtains data of a plurality of points representing the shape change of the welding region of the work, as data for candidate instruction points, and deletes part of the data which represents points satisfying a predetermined arc-line approximation condition for making instruction information including data of a plurality of points.

4. The control system according to claim 1, wherein the processor obtains data of a plurality of points representing the shape change of the welding region of the work, as data for candidate instruction points, and deletes part of the data which represents points satisfying a predetermined arc-line approximation condition for making the instruction information including data of a plurality of points.

5. A welding method by using a control system, the control system including a robot which moves a welder along a work for welding the work, a robot controller for controlling driving of the robot, and a detector for detecting a welding region of the work, the method comprising:
   a first step of having the welder perform rehearsal welding to a test work along a rehearsal welding path while causing the detector to detect a shape change of the welding region of the work that results during the welding;
   a second step of obtaining instruction information for the robot based on the shape change detected in the test work in the first stage to generate a corrected welding path that is adjusted relative to the rehearsal welding path; and
   a third step of welding another work by moving the welder along the corrected welding path based on the instruction information obtained in the second stage.

* * * * *

UNITED STATES PATENT AND TRADEMARK OFFICE
CERTIFICATE OF CORRECTION

PATENT NO.       : 7,605,347 B2
APPLICATION NO. : 10/544637
DATED            : October 20, 2009
INVENTOR(S)      : Izawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 370 days.

Signed and Sealed this

Fifth Day of October, 2010

David J. Kappos
*Director of the United States Patent and Trademark Office*